United States Patent [19]

Nakano et al.

[11] Patent Number: 5,077,131

[45] Date of Patent: Dec. 31, 1991

[54] MAGNETIC RECORDING MEDIUM

[75] Inventors: Yasushi Nakano; Noboru Koyama, both of Hino, Japan

[73] Assignee: Konica Corporation, Tokyo, Japan

[21] Appl. No.: 495,382

[22] Filed: Mar. 16, 1990

[30] Foreign Application Priority Data

Mar. 23, 1989 [JP] Japan ................................. 1-72915

[51] Int. Cl.⁵ ............................................ G11B 23/00
[52] U.S. Cl. ............................ 428/423.9; 427/131; 428/694; 428/900
[58] Field of Search ................ 428/694, 900, 423.9; 427/131

[56] References Cited

U.S. PATENT DOCUMENTS

| | | | |
|---|---|---|---|
| 4,624,883 | 11/1986 | Yamaguchi et al. | 428/900 |
| 4,784,895 | 11/1988 | Mizuno et al. | 428/694 |
| 4,784,914 | 11/1988 | Matsufugi et al. | 428/900 |
| 4,851,289 | 7/1989 | Ogawa et al. | 428/900 |
| 4,857,288 | 8/1989 | Ogawa et al. | 427/131 |
| 4,865,924 | 9/1989 | Saito et al. | 428/694 |

*Primary Examiner*—Paul J. Thibodeau
*Attorney, Agent, or Firm*—Jordan B. Bierman

[57] ABSTRACT

A magnetic recording medium having the excellent properties including the electromagnetic conversion properties is disclosed. The magnetic recording medium comprises a support and provided thereon in sequence the first magnetic layer and the second magnetic layer, wherein the first magnetic layer contains a magnetic substance of 1200 to 3500 grains/$\mu m^3$ and the magnetic layer contains a magnetic substance of 3500 to 7000 grains/$\mu m^3$.

5 Claims, No Drawings

MAGNETIC RECORDING MEDIUM

FIELD OF THE INVENTION

The present invention relates to a magnetic recording medium such as a magnetic tape, a magnetic disc and a magnetic floppy disc, more specifically to a magnetic recording medium suitable for a video tape.

BACKGROUND OF THE INVENTION

In recent years, there have been increasing demands for higher density magnetic recording media. Particularly in video tapes, recording in very high density as well as in higher frequency range has been desired. With this background, various designs have been proposed, in which the support is coated with a magnetic layer comprising two layers (upper and lower layers) or three or more layers (hereinafter referred to as a multilayer structure).

Japanese Patent Publication Open to Public Inspection (hereinafter referred to as Japanese Patent O.P.I.) Nos. 56228/1983, 56230/1983, 70429/1983 and 98135/1982 disclose the methods of increasing multilayer tape density in which the BET value and grain size in each of the upper and lower magnetic layers are controlled.

However, significant improvement in electromagnetic conversion properties of multilayer tapes cannot be expected even when the BET value of the magnetic substance is increased or the grain size is decreased, unless the loading rate of the magnetic substance in the magnetic layer is optimized.

Japanese Patent O.P.I. Nos. 69528/1982, 20042/1983 and 31018/1987 and Japanese Patent Examined Publication No. 8286/1979 disclose the methods in which the content and loading rate of the magnetic substance in each of the upper and lower layers are increased.

However, in these methods, an actual loading rate of the magnetic substance is liable to be lower than expected due to the pores in the magnetic layer since the content and loading rate are calculated on the basis of the weight ratio of the magnetic substance to the solid matters in the magnetic paint. This often leads to lower electromagnetic conversion properties than those expected from the sufficiently high loading rate in calculation. For this reason, these methods are inappropriate for the representation of the content and loading rate of the magnetic substance.

SUMMARY OF THE INVENTION

An object of the present invention is to establish a representation method for the actual loading rate of the magnetic substance in the magnetic layer of the magnetic recording medium, and the other object is to provide a magnetic recording medium of which electromagnetic conversion properties are improved by incorporating a prescribed number of the magnetic substance grains as calculated in accordance with this representation method into the upper and lower layers of the multilayer tape.

The above objects of the invention can be achieved by a magnetic recording medium comprising a non-magnetic support and provided thereon the first magnetic layer (a lower layer) and the second magnetic layer (an upper layer), wherein the first magnetic layer contains the magnetic substance of 1200 to 3500 grains/$\mu m^3$ and the second magnetic layer contains the magnetic substance of 3500 to 7000 grains/$\mu m^3$.

DETAILED DESCRIPTION OF THE INVENTION

There are various factors affecting the number of magnetic substance grains per unit volume in the magnetic layer. The typical factors are the following:

(1) Magnetic substance loading rate by weight (weight of magnetic substance/weight of solid matters in magnetic paint)×100,
(2) magnetic substance grain size (major axis length and minor axis length),
(3) Dispersion degree of magnetic substance,
(4) Calendering conditions, and
(5) Magnetic field orientation.

The higher the loading rate is, the number of the magnetic substance grains increases; the smaller the magnetic substance grain size is, the greater the number of the magnetic substance grains contained in unit volume is;

The higher the dispersion degree of the magnetic substance is, the greater the number of the magnetic substance grains contained in unit volume is;

The severer the calendering conditions are, the greater the number of magnetic substance grains contained in unit volume is.

In the present invention, the number of the magnetic substance grains in the magnetic layer can normally be controlled arbitrarily by selecting an appropriate combination of these five factors (1) through (5).

In the present invention, as stated above, the first magnetic layer (lower layer) contains preferably the magnetic substance of 1200 to 3500 grains/$\mu m^3$. If the loading rate of the magnetic substance is decreased to below 1200 grains/$\mu m3$, the loading amount thereof in the first magnetic layer becomes too small, which deteriorates a long wavelength recording property, particularly the reproduction outputs of chroma signal (500 kHz) and voice signal (10 to 100 kHz). If the loading rate of the magnetic substance is increased to above 3500 grains/$\mu m^3$, the loading amount of the magnetic substance becomes too large, which reduces the rigidity of the magnetic recording medium and affects the running durability. Further, it deteriorates the adhesion to the support, which may lead to pealing off of magnetic layer.

The second magnetic layer (upper layer) contains preferably the magnetic substance of 3500 to 7000 grains/$\mu m^3$. If the loading rate thereof is reduced to below 3500 grains/$\mu m^3$, the loading amount thereof becomes too small, which undesirably deteriorates a short wavelength recording property, particularly the reproduction output of lumi signal (4.2 MHz). If the magnetic substance is increased to above 7000 grains/$\mu m^3$, the friction coefficient of the second magnetic layer increases, which degrades the running durability of the magnetic recording medium.

The number of magnetic substance grains per unit volume ($\mu m^3$) in the magnetic layer can be measured and calculated from a cross section electronmicrograph of the magnetic layer.

Examples of the magnetic substances which can be used for the present invention are magnetic oxides such as $\gamma$-$Fe_2O_3$, Co-$\gamma$-$Fe_2O_3$ (e.g., Co-containing $\gamma$-$Fe_2O_3$, Co-coated $\gamma$-$Fe_2O_3$), Co-containing $\gamma$-FeOx or Co-coated $\gamma$-FeOx (1.33<X<1.50), $Fe_3O_4$, Co-$\gamma$-$Fe_3O_4$ (e.g., Co-containing $\gamma$-$Fe_3O_4$, Co-coated $\gamma$-$Fe_3O_4$) and $CrO_2$, as well as various ferromagnetic powders such as metallic magnetic powders composed mainly of Fe, Ni and Co including Fe, Ni, Fe-Ni alloys, Fe-Co alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-P alloys and Co-Cr alloys.

These metallic magnetic substances may contain Si, Cu, Zn, Al, P, Mn, Cr and other elements or their compounds as additives.

If Co-coated $\gamma$-FeOx ($1.33 < X < 1.50$) is used in combination with the above magnetic substances, the mixing ratio of Co-coated $\gamma$-FeOx to the magnetic substances is preferably 100:0 to 10:90.

Also used are iron nitride and hexagonal ferrite such as barium ferrite.

Examples of binders for the magnetic recording medium of the present invention include polyurethane having an abrasion resistance, which has strong adhesion to other substances and strong mechanical strength endurable to repeatedly exerted stress and bending as well as excellent resistance to abrasion and weather.

A cellulose resin and a vinyl chloride copolymer may be used in combination with polyurethane to improve the magnetic powder dispersibility in the magnetic layer, which results in increasing its mechanical strength.

Excessive layer hardness resulting from the single use of the cellulose resin or vinyl chloride copolymer can be prevented by polyurethane.

Examples of the cellulose resin are cellulose ethers, cellulose inorganic acid esters and cellulose organic acid esters.

The polyurethane and vinyl chloride copolymers may be partially hydrolyzed.

Examples of the vinyl chloride copolymers are vinyl chloride-vinyl acetate copolymers and vinyl chloride-vinyl acetate-vinyl alcohol copolymers.

The resins having anionic functional groups are preferably used.

The resins having the anionic functional groups can be prepared by introducing the anionic functional groups into polyurethane and vinyl chloride-vinyl acetate copolymer in such a manner that the resins are condensed via dehydrochlorination with a compound having in its molecule both an anionic functional group and chlorine such as $Cl-CH_2CH_2SO_3M$, $Cl-CH_2CH_2OSO_3M$ and

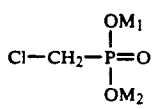

wherein M, $M_1$ and $M_2$ independently represent an alkali metal such as lithium, sodium and potassium.

The examples of the anionic groups are a sulfonic acid group and a carboxyl group.

Phenoxy resins can also be used, which have excellent mechanical strength and dimensional stability as well as good heat, water and chemical resistances and good adhesion.

It is possible to use mixtures with thermoplastic resins, thermosetting resins, reactive resins, electron beam-setting resins, as well as the above binders.

To improve the magnetic layer durability of the magnetic recording medium, various hardeners such as isocyanate can be added to the magnetic paint.

Examples of aromatic isocyanates are tolylenediisocyanate (TDI) and adducts of active hydrogen compounds and isocyanates, having preferably a molecular weight of 100 to 3,000.

Examples of aliphatic isocyanates are hexamethylene diisocyanate (HMDI) and adducts of active hydrogen compound and isocyanates, having preferably a molecular weight of 100 to 3,000. Among the aliphatic isocyanates, non-alicyclic isocyanates and adducts thereof with active hydrogen compounds are preferable.

The magnetic paint used to form the magnetic layer may contain dispersants and other additives such as lubricants, polishing agents, matting agents and antistatic agents.

Examples of dispersants are phosphates, amine compounds, alkyl sulfates, fatty amides, higher alcohols, polyethylene oxide, sulfosuccinic acid, sulfosuccinates, known surfactants and their salts, and salts of polymer dispersants with anionic organic group (e.g., $-COOH$).

Examples of lubricants are silicone oil, graphite, carbon black graft polymers, molybdenum disulfide, tungsten disulfide, lauric acid, myristic acid, stearic acid, oleic acid, esters of a monobasic fatty acid with a carbon number of 12 to 16 and a monohydric alcohol wherein the total carbon number is 21 to 23 (wax).

These lubricants are normally added in an amount of 0.2 to 20 parts by weight per 100 parts by weight of the binder.

Examples of polishing agents are aluminas, silicon carbide, chromium oxide, corundum, artificial corundum, and $\alpha$-$Fe_2O_3$. These polishing agents have normally an average grain size of 0.05 to 5 $\mu$m, and are added in an amount of 1 to 20 parts by weight per 100 parts by weight of the binder.

As a matting agent, conventional organic or inorganic powder is used singly or in mixture.

Examples of antistatic agents are electroconductive powders such as carbon black and graphite, nonionic, cationic and anionic surfactants, and amphoteric surfactants. Carbon black has preferably a grain size of 10 to 70 m$\mu$ and a specific surface area (BET) of 50 to 1000 m$^2$/g.

Conventional solvents such as acetone, methyl ethyl ketone, methanol and ethyl acetate may be used for the magnetic paint.

The materials for the support are polyesters such as polyethylene terephthalate and polyethylene-2,6-naphthalate, polyolefins, cellulose derivatives, polyamide, and polycarbonate.

The thickness of these supports is normally about 3 to 100 $\mu$m, preferably 5 to 50 $\mu$m in a film or sheet form, about 30 $\mu$m to 10 mm in a disc or card form.

An interlayer may be formed between the support and the magnetic layer to improve adhesion.

The magnetic layers can be coated on the support by the methods of air doctor coating, blade coating, air knife coating, squeeze coating, impregnation coating, reverse roll coating, transfer roll coating, gravure coating, kiss coating, cast coating, spray coating and extrusion coating.

A magnetic layer can be formed on the support by two methods; one method in which coating and drying are repeated for each layer (the wet-on-dry coating method) and the other method in which layers are coated on a wet layer simultaneously or in sequence (the wet-on-wet method), both of which can be used for the present invention. The wet-on-wet method is more preferable.

A nonmagnetic layer may be formed on, under or between the first and second magnetic layers.

The magnetic layer coated on the support may be subjected to orientation treatment for the ferromagnetic metal oxide powder in the layer, wherein the strength of the oriented magnetic field is about 500 to 5000 Gauss on an AC or DC basis. The magnetic layer may also be subjected to surface smoothing treatment. The processed medium is cut into a desired shape to prepare the magnetic recording medium of the present invention.

EXAMPLES

Magnetic paints having the compositions shown in Tables 1 and 2 respectively for the first magnetic layer (lower layer) and the second magnetic layer (upper layer) were each kneaded using a ball mill or a sand mill. Then, a solvent (mixture of methyl ethyl ketone and toluene) was added to adjust a viscosity of each magnetic paint to 5 to 20 poise.

Five parts by weight of polyisocyanate (tradename Coronate, produced by Nippon Polyurethane Industry Co., Ltd.) was then added to prepare a magnetic paint for coating.

The magnetic paints for the lower and upper layers were coated by the wet-on-wet method to form a double layer structure, followed by drying to prepare a magnetic recording medium.

The samples of the magnetic recording medium were prepared by changing the factors affecting the number of magnetic substance grains in each magnetic layer as defined in the present invention, such as the loading rate, grain size of the magnetic substance, the dispersion degree of the magnetic substance, calendering conditions and magnetic field orientation in the magnetic layers of this magnetic recording medium as shown in Table 3. The electromagnetic conversion properties and other properties of the magnetic recording medium were measured by the following methods, and the results are shown in Table 4.

RF output

A 100% white signal was inputted to the magnetic recording tape at reference level; the reproduced RF output signal was inputted to the AC ammeter N-170L produced by NF Design Block Co.; the output level was measured.

Chroma output

The reproduction output of an RF signal in 500 kHz was measured.

Lumi S/N

A 100% white signal was inputted to the magnetic recording tape at a standard level; the reproduced video signal was inputted to 925D/1 (noise meter produced by Shibasoku Co.); lumi S/N was determined by the absolute noise value.

Chroma S/N

The chroma signal S/N difference was measured in comparison with the reference tape with the noise meter model 925D/1 produced by Shibasoku Co.

Still characteristic

Still mode reproduction was performed; the time (min.) until the occurrence of a severe image disturbance was measured (measuring instrument: NV-6600 model produced by Matsushita Electric Co., Ltd.).

Drop-out

A 100% white signal was put in a given length (10 to 30 m) of the magnetic tape and reproduced. The 10 μs drop-out was counted at the -14 dB level for every one minute over the whole measured length of the tape using a counter produced by Shibasoku Co. (VHO1BZ), and the average value was obtained for drop-out.

TABLE 1

| Magnetic paint for the first magnetic layer (lower layer) | |
| --- | --- |
| | Ratio (parts by weight) |
| FeOx (X = 1.37, Hc = 700.0 e, average grain size 0.3 × 0.03 μm) | 100 |
| Polyvinyl chloride with anionic functional group, NR110, produced by Nippon Zeon Co., Ltd. | 10 |
| Polyurethane with anionic functional group, UR-8300, produced by Toyobo Co., Ltd. | 5 |
| Cyclohexanone | 100 |
| Methyl ethyl ketone | 100 |
| Toluene | 100 |

TABLE 2

| Magnetic paint for the second magnetic layer (upper layer) | |
| --- | --- |
| | Ratio (parts by weight) |
| Co-γ-Fe$_2$O$_3$ (Hc = 850.0 e, average grain size 0.2 × 0.03 μm) | 100 |
| Aluminum oxide (average grain size 0.2 μm) | 5 |
| Carbon Black (average grain size 40 mμ) | 0.5 |
| Polyvinyl chloride with anionic functional group, NR110, produced by Nippon Zeon Co., Ltd. | 10 |
| Polyurethane with anionic functional group, UR-8300, produced by Toyobo Co., Ltd. | 5 |
| Myristic acid | 1 |
| Butyl stearate | 0.5 |
| Cyclohexanone | 100 |
| Methyl ethyl ketone | 100 |
| Toluene | 100 |

TABLE 3

| | Example | | | | | | | |
| --- | --- | --- | --- | --- | --- | --- | --- | --- |
| | Example 1 | | Example 2 | | Example 3 | | Example 4 | |
| Property | Upper layer | Lower layer | Upper layer | Lower layer | Upper layer | Lower layer | Upper layer | Lower layer |
| Magnetic substance loading rate (%) | 78.8 | 83.0 | 82.0 | 83.0 | 81.0 | 79.0 | 83.0 | 79.0 |
| Magnetic substance grain size (major axis × minor axis, μm) | 0.2 × 0.03 | 0.3 × 0.03 | 0.2 × 0.03 | 0.3 × 0.03 | 0.2 × 0.03 | 0.33 × 0.03 | 0.2 × 0.027 | 0.33 × 0.03 |
| Dispersion degree of magnetic substance (sand | 100 min. | 60 min. | 100 min. | 60 min. | 100 min. | 100 min. | 100 min. | 100 min. |

TABLE 3-continued

|  | | | | | | | | |
|---|---|---|---|---|---|---|---|---|
| mill dispersion time) | | | | | | | | |
| Calendering conditions | | | | | | | | |
| Speed (m/min.) | 50 | | 50 | | 50 | | 50 | |
| Temperature (°C.) | 80 | | 80 | | 80 | | 80 | |
| Pressure (kg/cm$^2$) | 200 | | 300 | | 200 | | 200 | |
| Number of nips | 4 | | 4 | | 4 | | 4 | |
| Magnetic field orientation (Gauss) | 2000/2000 | | 2000/2000 | | 2000/2000 | | 2000/4000 | |
| Number of magnetic substance grains in the magnetic layer (grains/μm$^3$) | 4500 | 3000 | 6000 | 3500 | 3600 | 1200 | 6800 | 1200 |

| | Example | | | | | | | |
|---|---|---|---|---|---|---|---|---|
| | Example 5 | | Comparison 1 | | Comparison 2 | | Comparison 3 | |
| Property | Upper layer | Lower layer | Upper layer | Lower layer | Upper layer | Lower layer | Upper layer | Lower layer |
| Magnetic substance loading rate (%) | 82.0 | 80.0 | 80.0 | 83.0 | 82.0 | 78.8 | 82.5 | 78.0 |
| Magnetic substance grain size (major axis × minor axis, μm) | 0.2 × 0.03 | 0.3 × 0.03 | 0.2 × 0.03 | 0.3 × 0.03 | 0.2 × 0.03 | 0.2 × 0.03 | 0.2 × 0.027 | 0.33 × 0.03 |
| Dispersion degree of magnetic substance (sand mill dispersion time) | 100 min. | 100 min. | 100 min. | 60 min. | 100 min. | 100 min. | 100 min. | 60 min. |
| Calendering conditions | | | | | | | | |
| Speed (m/min.) | 50 | | 50 | | 50 | | 50 | |
| Temperature (°C.) | 80 | | 60 | | 80 | | 80 | |
| Pressure (kg/cm$^2$) | 200 | | 100 | | 100 | | 100 | |
| Number of nips | 4 | | 2 | | 2 | | 4 | |
| Magnetic field orientation (Gauss) | 2000/2000 | | 2000/2000 | | 2000/2000 | | 2000/3500 | |
| Number of magnetic substance grains in the magnetic layer (grains/μm$^3$) | 3700 | 3300 | 3300 | 2800 | 5100 | 4500 | 6400 | 1000 |

| | Example | | | | | |
|---|---|---|---|---|---|---|
| | Comparison 4 | | Comparison 5 | | Comparison 6 | |
| Property | Upper layer | Lower layer | Upper layer | Lower layer | Upper layer | Lower layer |
| Magnetic substance loading rate (%) | 90.0 | 78.0 | 78.0 | 78.8 | 80.0 | 73.0 |
| Magnetic substance grain size (major axis × minor axis, μm) | 0.15 × 0.02 | 0.33 × 0.03 | 0.2 × 0.033 | 0.2 × 0.03 | 0.2 × 0.03 | 0.2 × 0.035 |
| Dispersion degree of magnetic substance (sand mill dispersion time) | 200 min. | 60 min. | 100 min. | 100 min. | 100 min. | |
| Calendering conditions | | | | | | |
| Speed (m/min.) | 50 | | 50 | | 50 | |
| Temperature (°C.) | 80 | | 70 | | 70 | |
| Pressure (kg/cm$^2$) | 100 | | 150 | | 150 | |
| Number of nips | 4 | | 4 | | 4 | |
| Magnetic field orientation (Gauss) | 2000/4000 | | 2000/2000 | | 2000/2000 | |
| Number of magnetic substance grains in the magnetic layer | 8300 | 1000 | 2800 | 4200 | 4000 | 1000 |

TABLE 3-continued (grains/$\mu m^3$)

Note:
1. Magnetic field orientation was carried out after coating the upper and lower layers.
2. The upper and lower layers were subjected to calendering treatment in the same conditons.

TABLE 4

|  | Example 1 | | Example 2 | | Example 3 | | Example 4 | | Example 5 | | Comparison 1 | |
| --- | --- | --- | --- | --- | --- | --- | --- | --- | --- | --- | --- | --- |
|  | Upper layer | Lower layer | Upper layer | Lower layer | Upper layer | Lower layer | Upper layer | Lower layer | Upper layer | Lower layer | Upper layer | Lower layer |
| Number of magnetic substance grains in the magnetic layer (grains/$\mu m^3$) | 4500 | 3000 | 6000 | 3500 | 3600 | 1200 | 6800 | 1200 | 3700 | 3300 | 3300 | 2800 |
| RF output (dB) | +0.9 | | +0.5 | | +0.3 | | +1.5 | | +0.4 | | −1.0 | |
| Chroma output (dB) | +0.1 | | +0.1 | | +0.1 | | +0.9 | | +0.3 | | −1.1 | |
| Lumi S/N (dB) | +1.4 | | +0.8 | | +0.3 | | +1.5 | | +0.5 | | −0.8 | |
| Chroma S/N (dB) | +1.9 | | +1.1 | | +0.5 | | +1.8 | | +0.7 | | −1.2 | |
| Still characteristic (death time, min.) | 120 | | 120 | | 120 | | 120 | | 120 | | 60 | |
| Drop-out (−14 dB, 10 $\mu$s) | 2 | | 0 | | 3 | | 2 | | 3 | | 11 | |

|  | Comparison 2 | | Comparison 3 | | Comparison 4 | | Comparison 5 | | Comparison 6 | |
| --- | --- | --- | --- | --- | --- | --- | --- | --- | --- | --- |
|  | Upper layer | Lower layer | Upper layer | Lower layer | Upper layer | Lower layer | Upper layer | Lower layer | Upper layer | Lower layer |
| Number of magnetic substance grains in the magnetic layer (grains/$\mu m^3$) | 5100 | 4500 | 6400 | 1000 | 8300 | 1000 | 2800 | 4200 | 4000 | 1000 |
| RF output (dB) | −0.5 | | −0.3 | | +0.1 | | −1.5 | | −2.0 | |
| Chroma output (dB) | +0.5 | | +0.1 | | −0.5 | | −2.2 | | −1.5 | |
| Lumi S/N (dB) | −0.1 | | −0.1 | | +0.1 | | −1.3 | | −1.3 | |
| Chroma S/N (dB) | −0.2 | | −0.2 | | −0.1 | | −1.6 | | −1.4 | |
| Still characteristic (death time, min.) | 30 | | 40 | | 42 | | 39 | | 60 | |
| Drop-out (−14 dB, 10 $\mu$s) | 10 | | 32 | | 18 | | 21 | | 15 | |

As is evident from Tables 3 and 4, in Examples 1 to 5 in which the numbers of the magnetic substance grains in the respective magnetic layers are within the range of the invention, the electromagnetic conversion properties and other properties are more excellent than in Comparisons 1 to 5 in which the numbers of the magnetic substance grains in either or both of the magnetic layers deviate from the range of the invention.

What is claimed is:

1. A magnetic recording medium comprising a support and provided thereon in sequence a first magnetic layer containing a first magnetic substance and a second magnetic layer containing a second magnetic substance, each of said first and second layers containing a binder, wherein said first magnetic layer contains 1200 to 3500 grains/$\mu m^3$ to said first magnetic substance and said second magnetic layer contains 3500 to 7000 grains/$\mu m^3$ to said second magnetic substance.

2. The magnetic recording medium of claim 1, wherein said binder is selected from a polyurethane resin, a vinyl chloride copolymer, a cellulose resin and a phenoxy resin.

3. The magnetic recording medium of claim 2, wherein said polyurethane resin and vinyl chloride copolymer each have an anionic functional group.

4. The magnetic recording medium of claim 1 wherein said first magnetic substance and said second magnetic substance are individually selected from the group consisting of $\gamma$-$Fe_2O_3$, Co-$\gamma$-$Fe_2O_3$, $\gamma$-$Fe_3O_4$, Co-$\gamma$-$Fe_3O_4$, $CrO_2$, Fe-Ni, Fe-Co, Fe-Ni-P, Fe-Ni-Co, Fe-Mn-Zn, Fe-Ni-Zn, Fe-Co-Ni-Cr, Fe-Co-Ni-P, Co-P, and Co-Cr.

5. The magnetic recording medium of claim 1 wherein said first magnetic substance and said second magnetic substance are Co-$\gamma$-$Fe_2O_3$.

* * * * *